US012785966B2

(12) United States Patent
Roukoz

(10) Patent No.: US 12,785,966 B2
(45) Date of Patent: Nov. 3, 2026

(54) SYSTEMS, METHODS, AND DEVICES FOR IDENTITY VERIFICATON

(71) Applicant: BitsProof Inc., Toronto (CA)

(72) Inventor: François Roukoz, Woodbridge (CA)

( * ) Notice: Subject to any disclaimer, the term of this patent is extended or adjusted under 35 U.S.C. 154(b) by 6 days.

(21) Appl. No.: 18/370,631

(22) Filed: Sep. 20, 2023

(65) Prior Publication Data

US 2025/0097035 A1 Mar. 20, 2025

(51) Int. Cl.

*G06F 21/00* (2013.01)
*H04L 9/30* (2006.01)
*H04L 9/32* (2006.01)

(52) U.S. Cl.

CPC .......... *H04L 9/3213* (2013.01); *H04L 9/3073* (2013.01)

(58) Field of Classification Search

CPC ........ H04L 9/3213; H04L 9/3073; H04L 9/32
See application file for complete search history.

(56) References Cited

U.S. PATENT DOCUMENTS

| | | | | |
|---|---|---|---|---|
| 10,931,461 | B2 | 2/2021 | Dilles et al. | |
| 2016/0239658 | A1 | 8/2016 | Loughlin-McHugh et al. | |
| 2018/0351747 | A1* | 12/2018 | Spangemacher | H04L 63/126 |
| 2019/0349372 | A1* | 11/2019 | Smith | G06F 21/31 |
| 2020/0014537 | A1* | 1/2020 | Ortiz | G06F 21/31 |
| 2020/0389450 | A1* | 12/2020 | Levitt | G06Q 20/385 |
| 2020/0401727 | A1* | 12/2020 | Hennessy | H04L 9/50 |
| 2021/0144010 | A1* | 5/2021 | Tang | F41H 5/24 |
| 2021/0184856 | A1* | 6/2021 | Johnson | G06F 16/1865 |
| 2021/0243023 | A9* | 8/2021 | Khan | G06V 30/40 |
| 2021/0319192 | A1* | 10/2021 | Rodriguez | H04L 63/0861 |
| 2022/0329436 | A1* | 10/2022 | Gaur | H04L 9/3239 |
| 2023/0034169 | A1* | 2/2023 | Ferenczi | H04L 9/0861 |
| 2023/0198968 | A1* | 6/2023 | Medvinsky | H04L 63/0435 713/155 |
| 2023/0222488 | A1* | 7/2023 | Campbell | G06Q 20/401 |
| 2023/0297716 | A1* | 9/2023 | Bella | H04W 12/10 726/1 |
| 2023/0370266 | A1* | 11/2023 | Kondo | H04L 9/3239 |
| 2025/0337579 | A1* | 10/2025 | Wang | H04L 9/3213 |

FOREIGN PATENT DOCUMENTS

WO WO2016128569 A1 8/2016

* cited by examiner

*Primary Examiner* — Michael M Lee
(74) *Attorney, Agent, or Firm* — HEER LAW; Christopher D. Heer

(57) ABSTRACT

A computer-implemented system and method for identity verification is described. The system includes a data verifier configured to validate user identification data associated with a user; a data tokenizer configured to generate a token based on the user identification data and store the token on a blockchain; and a data accessor configured to receive a request from a requestor user for the user identification data and return the token associated with the user identification data to the requestor user following grant of the request by the user.

10 Claims, 9 Drawing Sheets

SYSTEMS, METHODS, AND DEVICES FOR IDENTITY VERIFICATON

FIELD

The present specification relates generally to decentralized computer platforms and more specifically to decentralized platforms storing tokens.

BACKGROUND

Decentralized computer platforms such as blockchain can provide computer architecture suitable for enabling a public and verifiable record of data. Users may desire to keep identity data private and share the data with only certain other users, such as a private or public entity.

SUMMARY

In accordance with an aspect, a computer-implemented system for identity verification includes: a data verifier configured to validate user identification data associated with a user; a data tokenizer configured to generate a token based on the user identification data and store the token on a blockchain; and a data accessor configured to receive a request from a requestor user for the user identification data and return the token associated with the user identification data to the requestor user following grant of the request by the user.

In some embodiments, the data verifier configured to generate a data representation encoding data for requesting identification data of a user, based on the user identification data.

In some embodiments, the data representation encodes a public key associated with the user and usable for decrypting the token.

In some embodiments, the data representation is a QR code.

In some embodiments, the validation of user identification data includes requesting validation from a remote service.

In some embodiments, the computer-implemented system for identity verification includes an updater configured to update the system based on data received from a remote server.

In some embodiments, the computer-implemented system for identity verification includes a display generator configured to generate at least one display configured to request user identification data and to receive at least one request for user identification data.

In some embodiments, the data verifier is further configured to generate a user account following validation of the user identification data.

In some embodiments, transmission of data is encrypted using private-public key pairs.

In some embodiments, the token is decryptable using a public key associated with the user.

In accordance with an aspect, a computer-implemented method for identity verification includes: validating user identification data associated with a user; generating a token based on the user identification data; storing the token on a blockchain; and receiving a request, at a processor, from a requestor user for the user identification data and returning the token associated with the user identification data to the requestor user following grant of the request by the user.

In some embodiments, the computer-implemented method for identity verification includes generating a data representation encoding data for requesting identification data of a user, based on the user identification data.

In some embodiments, the data representation encodes a public key associated with the user and usable for decrypting the token.

In some embodiments, validating user identification data includes requesting validation from a remote service.

In some embodiments, the computer-implemented method for identity verification includes updating the system based on data received from a remote server.

In some embodiments, the computer-implemented method for identity verification includes generating at least one display configured to request user identification data and to receive at least one request for user identification data.

In some embodiments, the computer-implemented method for identity verification includes generating a user account following validation of the user identification data.

In some embodiments, the transmission of data is encrypted using private-public key pairs.

In some embodiments, the computer-implemented method for identity verification includes decrypting the token using a public key associated with the user.

In accordance with an aspect, there is provided a non-transitory computer readable medium storing a set of machine-interpretable instructions, which, when executed, cause a processor to perform a method for identity verification, the method comprising: validating user identification data associated with a user; generating a token based on the user identification data; storing the token on a blockchain; and receiving a request, at a processor, from a requestor user for the user identification data and return the token associated with the user identification data to the requestor user following grant of the request by the user.

Other aspects and features will become apparent to those ordinarily skilled in the art upon review of the following description of embodiments in conjunction with the accompanying figures.

BRIEF DESCRIPTION OF THE DRAWINGS

The principles may better be understood with reference to the accompanying figures provided by way of illustration of an exemplary embodiment, or embodiments, incorporating principles and aspects of various embodiments, and in which.

DETAILED DESCRIPTION

Figure 1:
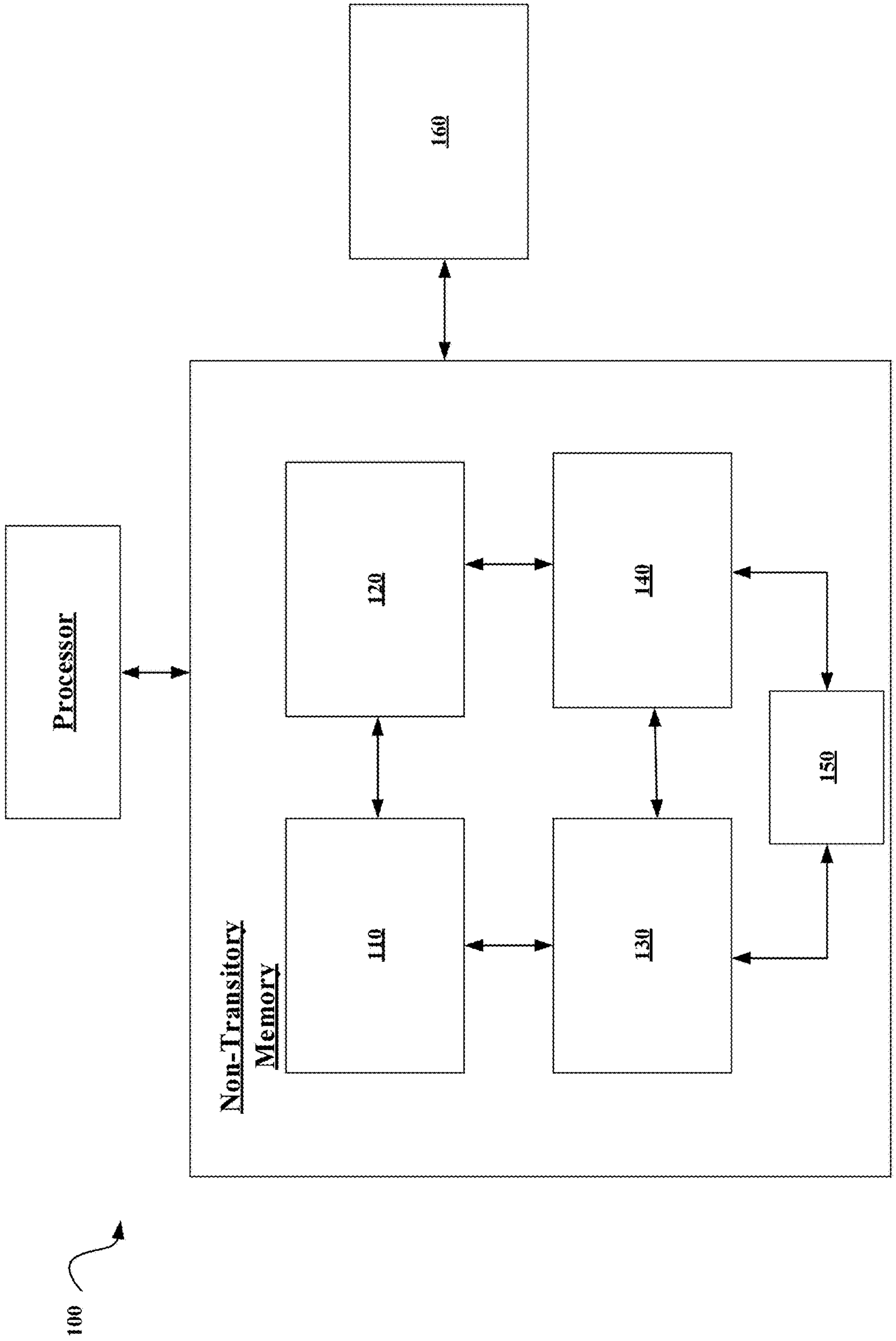
FIG. 1 is a schematic view of an identity verification platform, according to some embodiments.

The description that follows, and the embodiments described therein, are provided by way of illustration of an example, or examples, of particular embodiments of the principles of embodiments. These examples are provided for the purposes of explanation, and not of limitation, of those principles. In the description, like parts are marked throughout the specification and the drawings with the same respective reference numerals. The drawings are not necessarily to scale and in some instances proportions may have been exaggerated in order to more clearly to depict certain features.

FIG. 1 is a schematic view of an example identity verification platform 100 according to some embodiments. In some embodiments, identity verification platform 100 includes one or more processing devices and one or more storage devices. Identity verification platform 100 is implemented as a decentralized platform, according to some embodiments. Each component of identity verification platform 100 can be implemented by more than one processor or node and can be decentralized, and references to a singular processing device or other component can be more than one of same in some embodiments.

Figure 4:
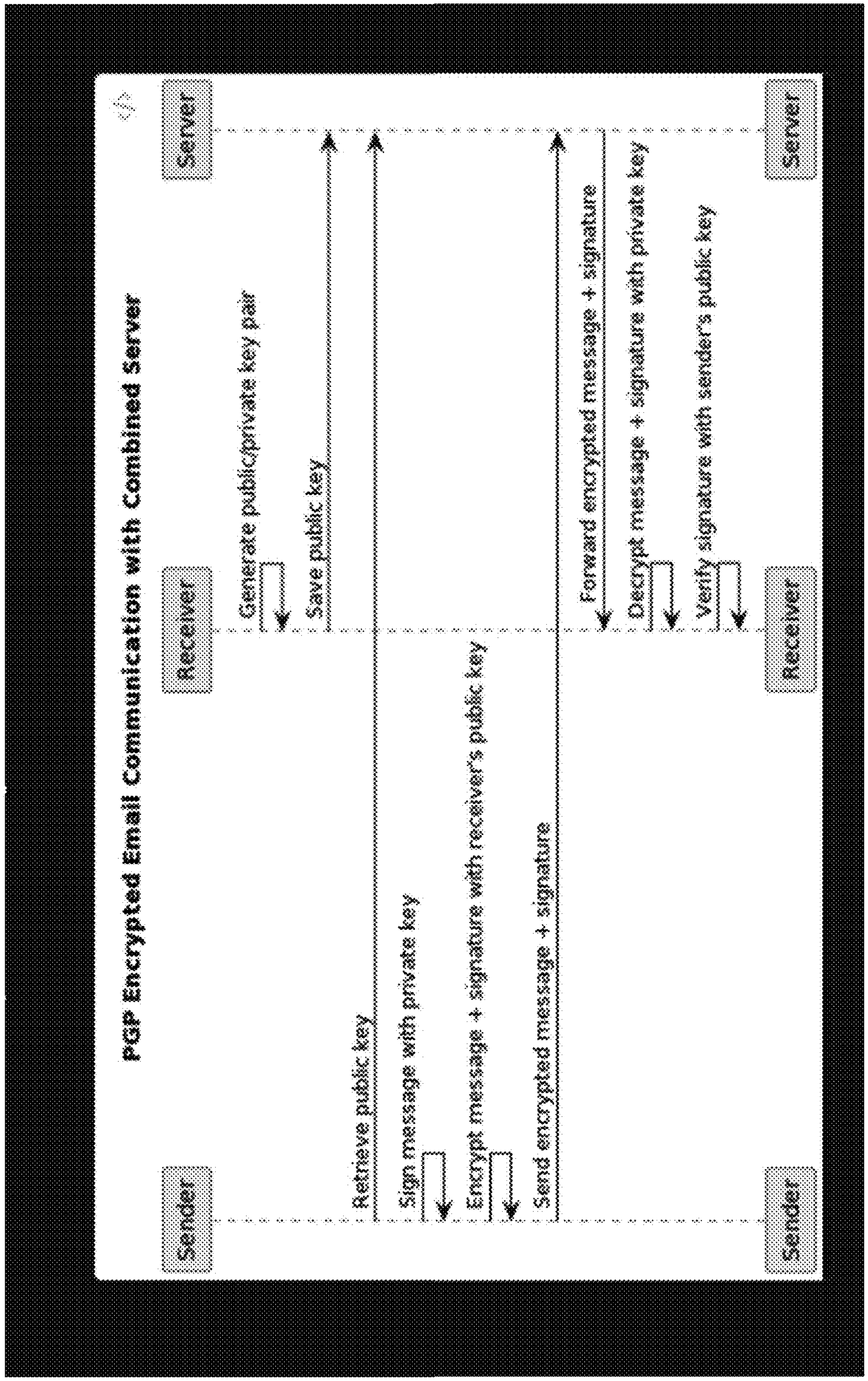
FIG. 4 is a view of an encrypted communication process implemented by identity verification platform, according to some embodiments.
Figure 5:
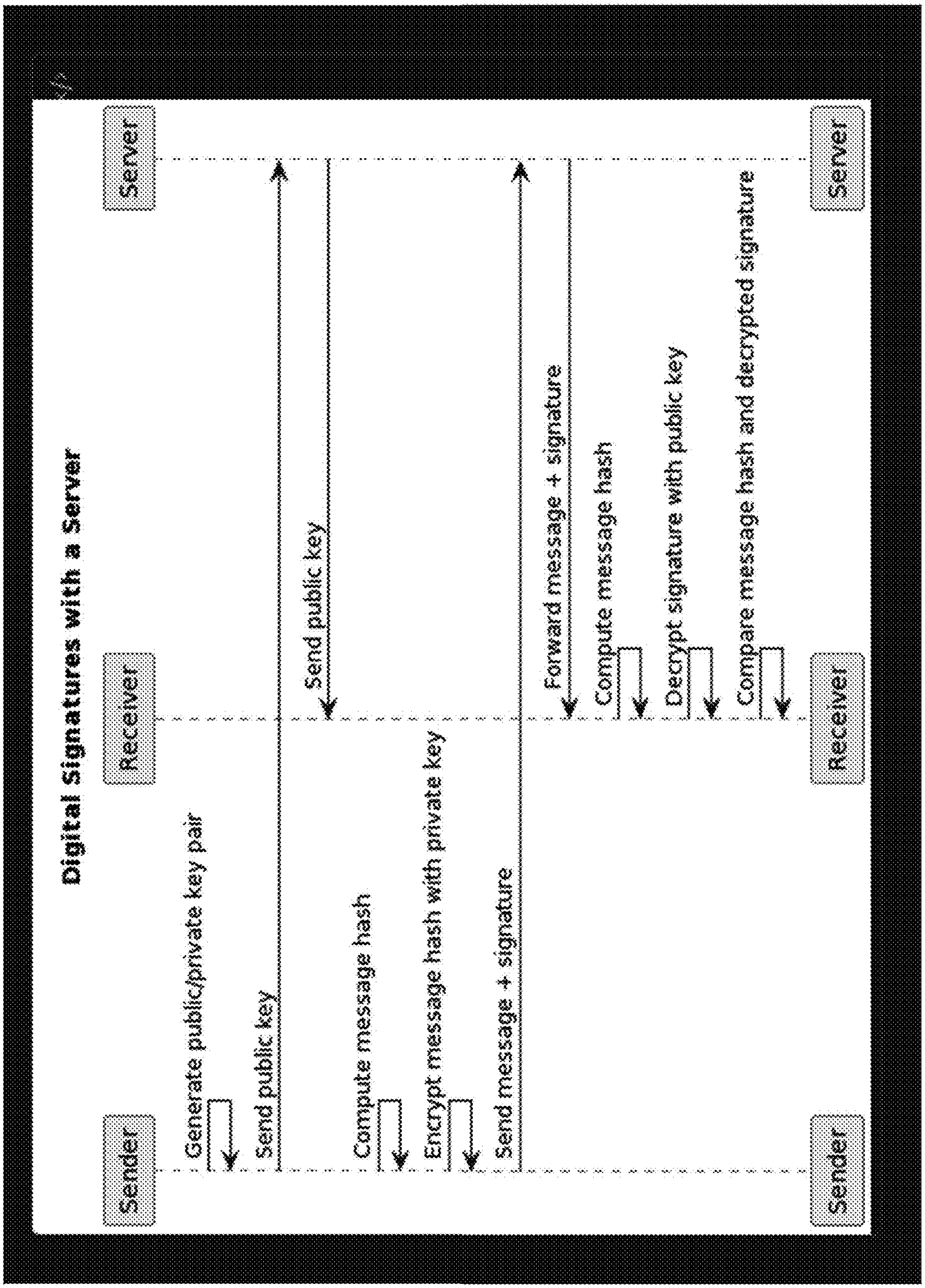
FIG. 5 is a view of an encrypted communication process implemented by identity verification platform, according to some embodiments.
Figure 6:
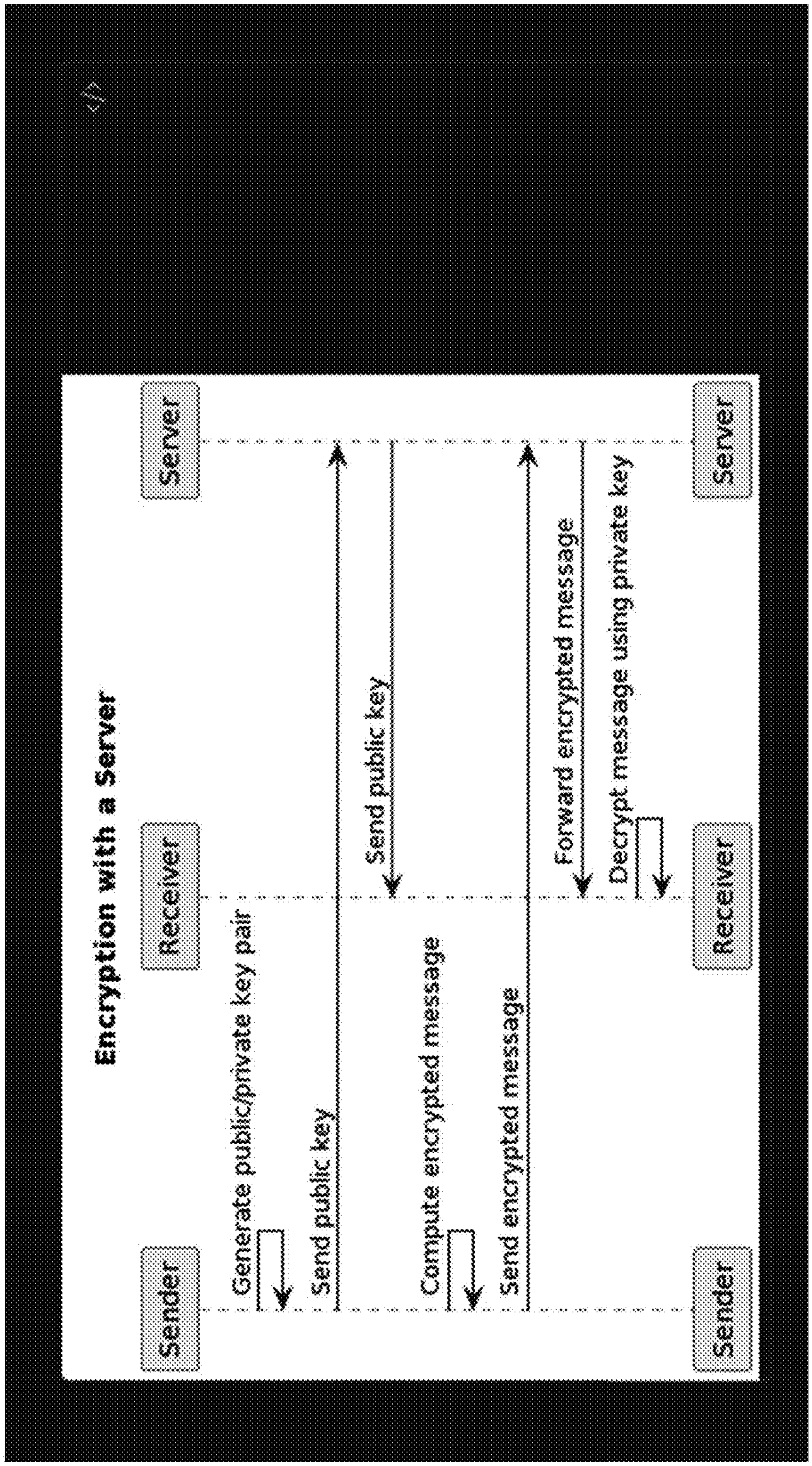
FIG. 6 is a view of an encrypted communication process implemented by identity verification platform, according to some embodiments.

In some embodiments, identity verification platform 100 includes data verifier 110, data tokenizer 120, and data accessor 130. In some embodiments, identity verification platform 100 further includes updater 140 and/or display generator 150. A processing device of identity verification platform 100 is configured to execute instructions in memory to configure data verifier 110, data tokenizer 120, data accessor 130, updater 140, and/or display generator 150. A computing device 160, such as a mobile device running a mobile application or a remote server, is configured to connect with identity verification platform 100 and allow for user engagement. Computing device 160 is configured to present a display generated by display generator 150, according to some embodiments. In some embodiments, data in identify verification platform 100 is encrypted, such as message data and/or sensitive information. For example, encryption or other security measures can be in place on a local device used by a user to access identity verification platform 100, while only tokenized data is stored on a database maintained by identity verification platform 100 (e.g., on a blockchain). In some embodiments, end-to-end encryption is used, where message data is encrypted on a sender's device and decrypted on a recipient's device, and, as shown in FIGS. 4, 5, and 6, digital signatures are implemented to allow for verification of a message's authenticity and source and reduce tampering.

In some embodiments, identity verification platform 100 is configured to create an account and associate same with a user and/or the user's identification data. For example, identify verification platform 100 is configured to create a user account, link the user's identity data to the account, and link a device to the user. In some embodiments, a user's account is created before verification is complete and, for security reasons, a user's account is locked until it is verified. In some embodiments, multi-factor authentication is used and includes sending a verification code to the user's email. The device is locked to the user account and can be used only after the user account is verified. To prevent identity theft, user identity is verified before the user can use the application on their mobile device, for example.

Figure 8:
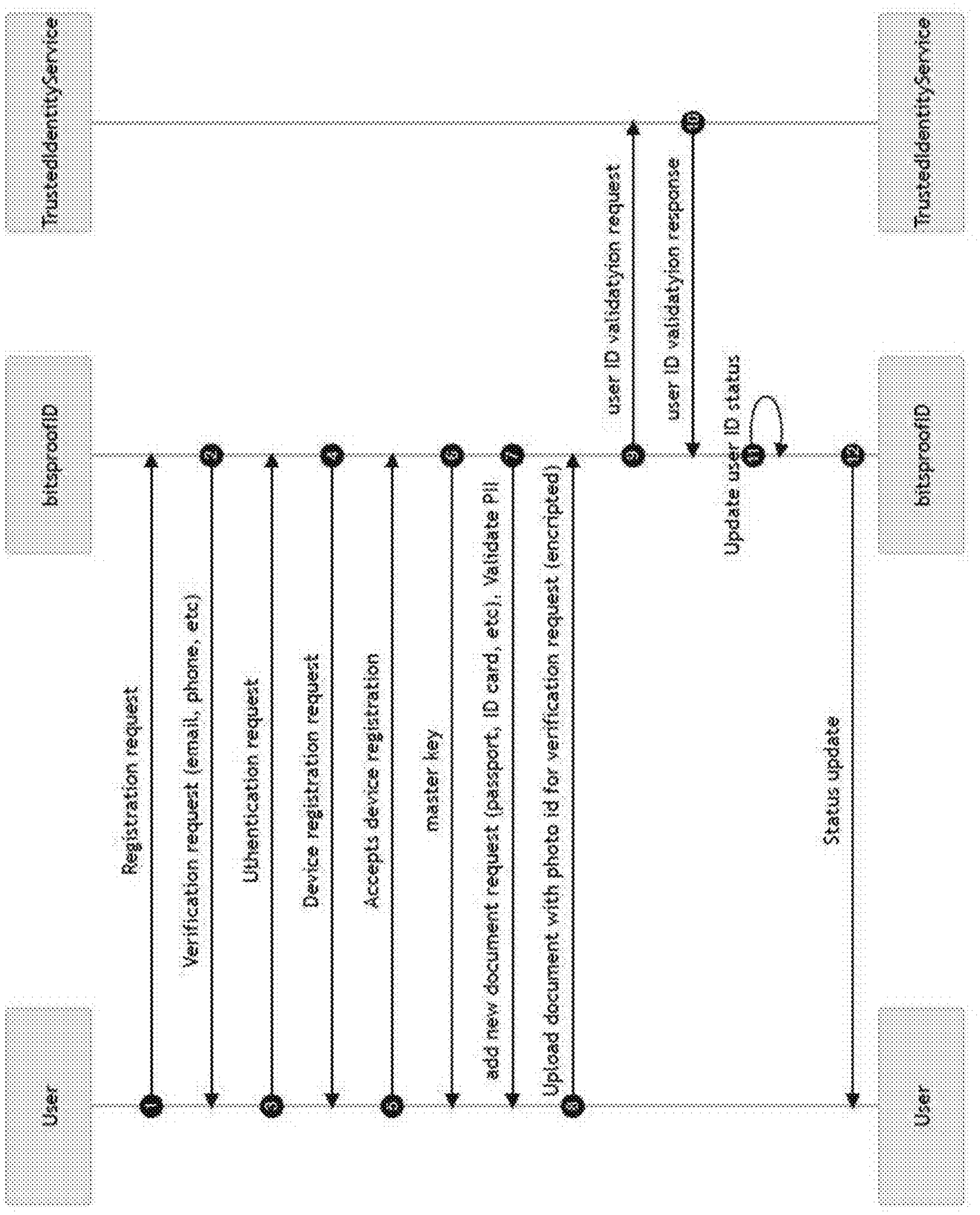
FIG. 8 is a view of a verification process implemented by identity verification platform, according to some embodiments.

In some embodiments, such as shown in FIG. 8, data verifier 110 is configured to receive data such as representing identification data. The identification data can be derived from user input representing one or more pieces of identification. For example, identity verification platform 100 can request at a display generated by display generator 150 and accessible via a mobile application that a user provide two pieces of identification. In some embodiments, data verifier 110 is configured to validate the data (e.g., identification data). For example, in some embodiments, data verifier 110 is configured to connect to a remote service, such as third party validator APIs. In some embodiments, data verifier 110 requests validation of the data and receives data representing successful or unsuccessful validation, for example. Data verifier 110 is configured to determine whether the data has been successfully validated and provide an indicator of same to data tokenizer 120. In some embodiments, an indicator per se is not generated. Users associated with validated identification data are added to the identity verification platform 100, according to some embodiments. A data representation, such as a QR code and/or unique number and/or other data, is generated for each user added, and same can be provided to user via display generator 150, according to some embodiments. The data representation, such as a QR code and/or unique number and/or other data, can be provided to a requestor to allow the requester to request the identity data of the user from identity verification platform 100. The data representation, such as a QR code and/or unique number and/or other data, includes the public key of the user (e.g., the public key or data usable to derive the public key such as at the requestor), according to some embodiments. For example, identity verification platform 100 can store a representation (e.g., an identifier) of a user or user account and denote same as a permitted user of identity verification platform 100. A user account for the user can then be generated, according to some embodiments. In some embodiments, strong authentication methods, such as two-factor authentication, is used by data verifier 110 in the alternative or in addition to validate the identification data.

In some embodiments, data tokenizer 120 is configured to generate a key, tokenize the key to generate a token, and store the token in at least one database or data store, such as in a node on a blockchain or decentralized ledger architecture. In some embodiments, no personal identifiable information (e.g., the data from which the token was derived) is stored in same, whether on a remote network or locally on an identity verification platform 100 local network. Personal identifiable information or other data from which the token was derived can remain locally on the user's personal device. In some embodiments, the key is associated with data received from the user, such as personal identifiable information (e.g., cellphone ID, user name). In some embodiments, each key is managed such that the keys are secure and can only be accessed by authorized parties. In some embodiments, each key is managed as follows. In some embodiments, client-side encryption is provided with advanced encryption standard (AEC) to protect data at rest (with master key being syncing to the bits backend, where user authentication will be used to protect the key). In some embodiments, encryption in transit is provided in addition or alternatively. This is separate from https, as data will be encrypted with asymmetrical keys where bits backend will be providing API to exchange public keys before sending data from the user to the consumer of data. The private key in this case will be stored on the user device and encrypted at rest with the first key, according to some embodiments.

Figure 7:
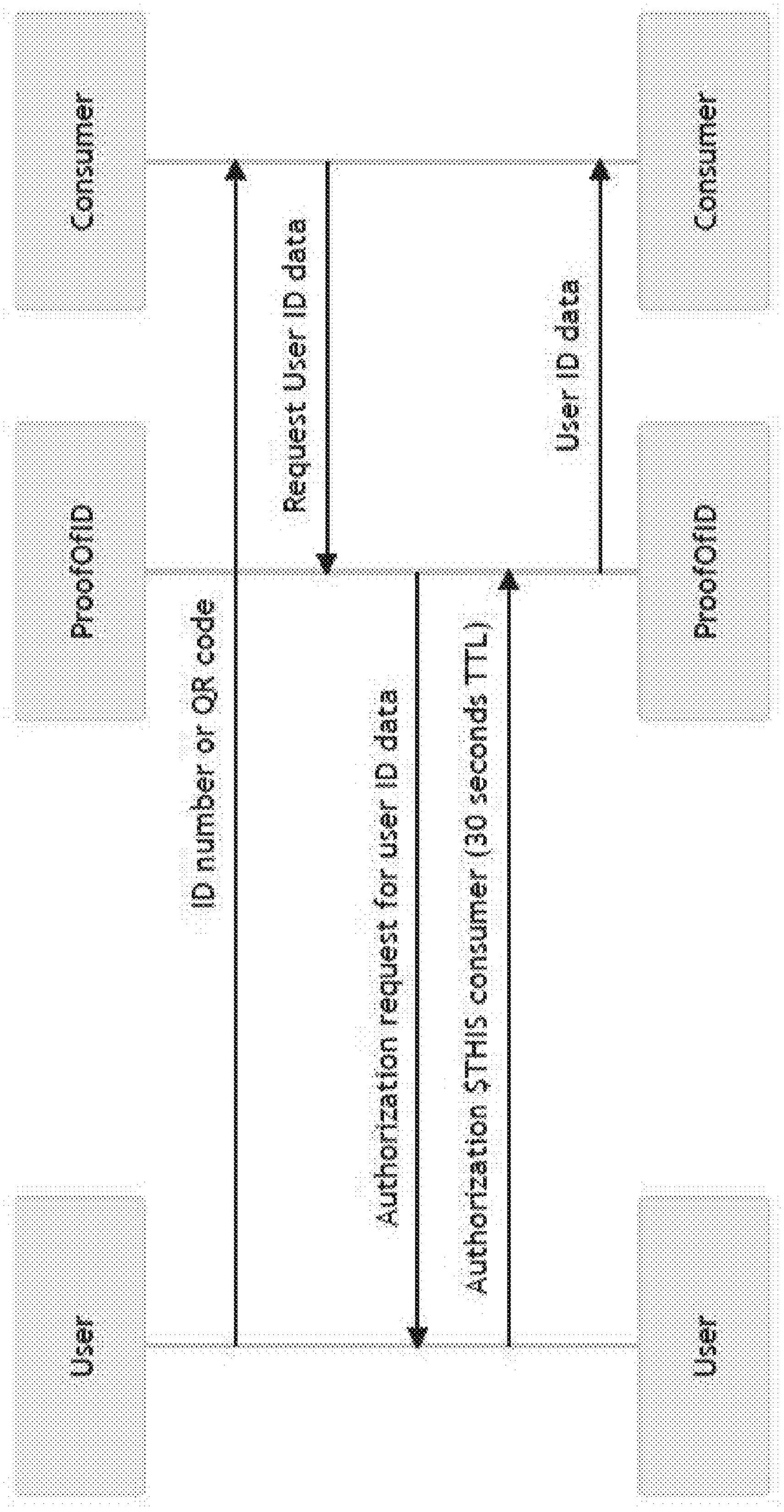
FIG. 7 is a view of verification and account creation processes implemented by identity verification platform, according to some embodiments.
Figure 9:
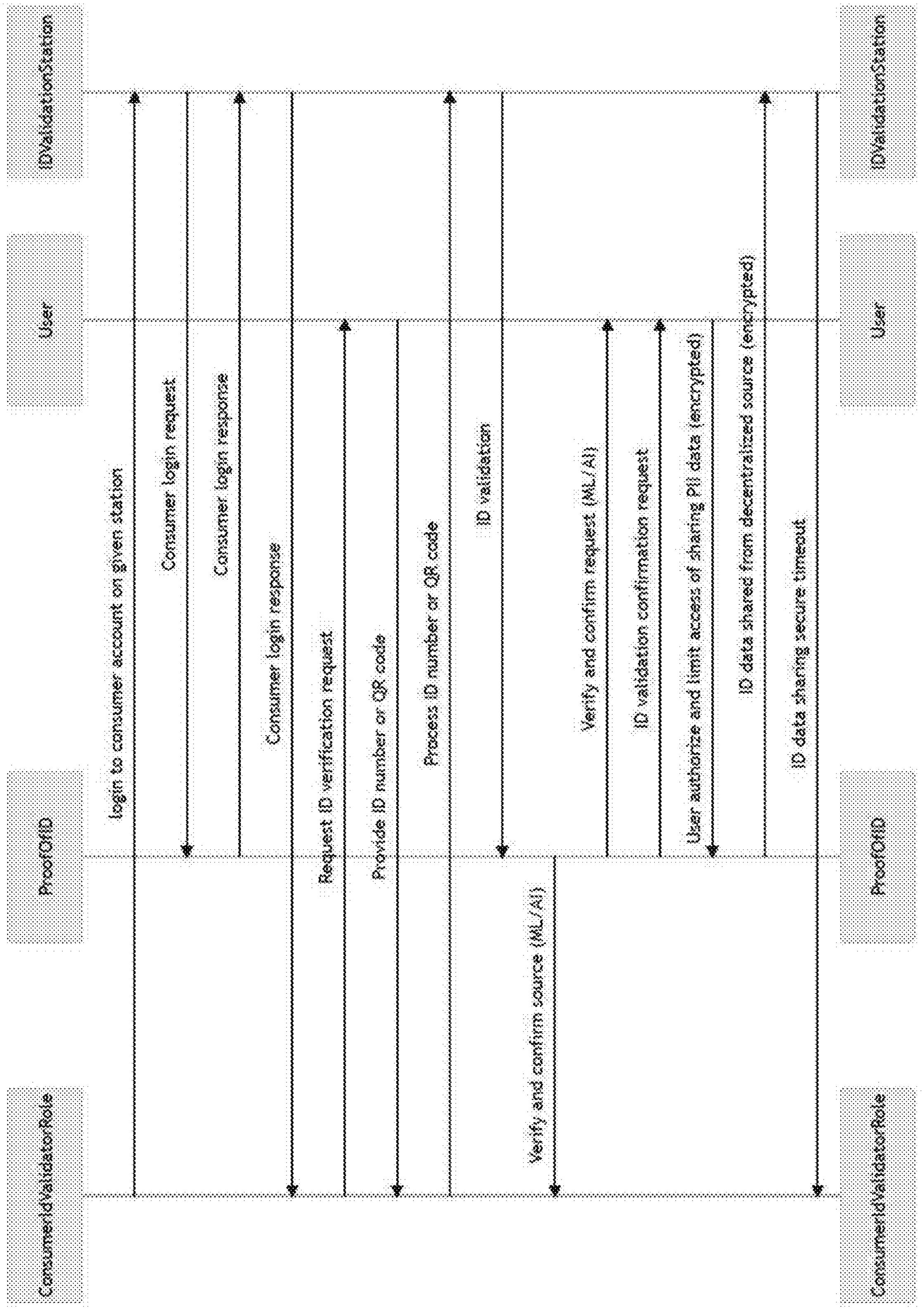
FIG. 9 is a view of an identity sharing process implemented by identity verification platform, according to some embodiments.

In some embodiments, such as shown in FIGS. 7 and 9, data accessor 130 is configured to receive and grant or deny a request for a user's proof of identity data. For example, in some embodiments, data accessor 130 is configured to receive a request for a token associated with a user (e.g., a user ID). Following receipt of the request, data accessor 130 is configured to transmit a notification to the associated user, such as via the associated user's app installed on the associated user's mobile device or other device. The associated user can provide data input to identity verification platform 100 such as via the app, where the data input is representative of a grant or denial of the request for the user's token. If a grant is indicated, data accessor 130 is configured to provide the associated token to the user (e.g., an entity) who requested the data. For example, data accessor 130 can retrieve the token associated with the user whose data was requested from the at least one database or data store (e.g., from a node on the blockchain) and provide same to the user who requested the data. The token can be shared from the decentralized data source in encrypted form, for example. If a denial is indicated, data accessor 130 is configured to not provide the associated token to the user (e.g., via that user's account via the app or other software) who requested the data and, in some embodiments, transmits notification of the denial to that user (e.g., via that user's account via the app or other software). The token is used to hide the user identity from the requestor and data accessor 130 is configured to match and connect the user's token with the request to allow the user to share their identity information (ID) from a local decentralized storage. The token is decrypted at the requestor using the user's public key to reveal the identity data of the user, in some embodiments. The public key is shared with the requestor such as via a data representation (e.g., QR code or other data) transmitted to the requestor such as by the user.

FIG. 7 shows an example method for transmitting user identity data implemented by an example identity verification platform 100, according to some embodiments. First, a user provides a data representation (e.g., ID number of QR code) to a requester (e.g., a consumer). The requester, using the data representation, requests the identity data of the user by engaging with data accessor 130 and data accessor 130 receives the request and generates a request that the user authorizes or denies the request for the user identity data to be provided to the requester. Following receipt of a grant of the request, data accessor 130 is configured to provide a token encrypting the user identity data to the requestor. The requestor can decrypt the token using a public key of the user, according to some embodiments.

In some embodiments, updater 140 is configured to send and receive data from a remote computer (e.g., server) related to updates. Updater 140 is configured to update identity verification platform 100 (including one or more of its components) based on the updates. For example, updater 140 can receive a command representing a particular software patch related to data tokenizer 120 and configure an update to data tokenizer 120. The update can change the functionality of the component(s) updated, according to some embodiments. Further, an update can fix a security vulnerability. Identify verification platform 100 can be regularly tested and its security evaluated to identify and allow for correction of any vulnerabilities or weaknesses. In some embodiments, identity verification platform 100 is configured with network security, such as firewall(s) and secure protocol(s), which protect data communication between a software application allowing access to identity verification platform 100 (e.g., as installed on a user's device), vendor users, other users, one or more remote computers implementing identity verification platform 100, and an API implemented by identity verification platform 100. An example security protocol requires users accessing identity verification platform 100 via an app installed on their local device to use a password with minimum criteria to login to their account.

Example embodiments of identity verification platform 100 will now be described according to some embodiments. In some embodiments, identity verification platform 100 is a decentralized, digital proof of identification (ID) software system for allowing the secure transmission of identification information between users and private institutions and government departments and agencies. In some embodiments, identity verification platform 100 provides an improvement over existing verification of identity technology at least in that existing technologies do not provide users control over their identification data sharing and lack alerting, encryption, and multifactor authentication.

In some embodiments, advantages of identity verification platform 100 include: (i) enabling users to have a verified, trusted and secure digital proof of ID; (ii) reducing and/or eliminating the risks of identity theft and fraud and related cybercrimes; (iii) securing identification data stored in a database and identification information exchanged between users and institutions; and (iv) providing a white labeled software which can be used by institutions to verify the identity of individuals.

In some embodiments, identity verification platform 100 is configured to include a number of security features including the use of data end-to-end-encryption, which is used to protect the transmission of data in the form of a message from sender to recipient such that messages are encrypted on the sender's device and decrypted on the recipient's device; the use of digital signatures to verify the authenticity of messages from sender to recipient to prevent tampering; multifactor authentication methods such as two-factor authentication to verify the identity of users; the implementation of key management procedures to ensure that the encryption keys are kept secure and can only be accessed by authorized parties; secure API; an alert function in the case of a Personal Identifier Information (PII) data breach or unauthorized attempt and a function to authorize institutions to access users' PII data upon request; storage of data locally on the user's device such that the database included in identity verification platform 100 only stores tokenized data; network security measures such as firewalls and secure protocols, to protect the communication between the app for accessing identity verification platform 100, vendor users, and the server, and the API; regular updates to the mobile device application and/or its components to fix any known security vulnerabilities; and regular testing and evaluation of the mobile device application to identify and fix any security vulnerabilities or weaknesses.

Figure 2:
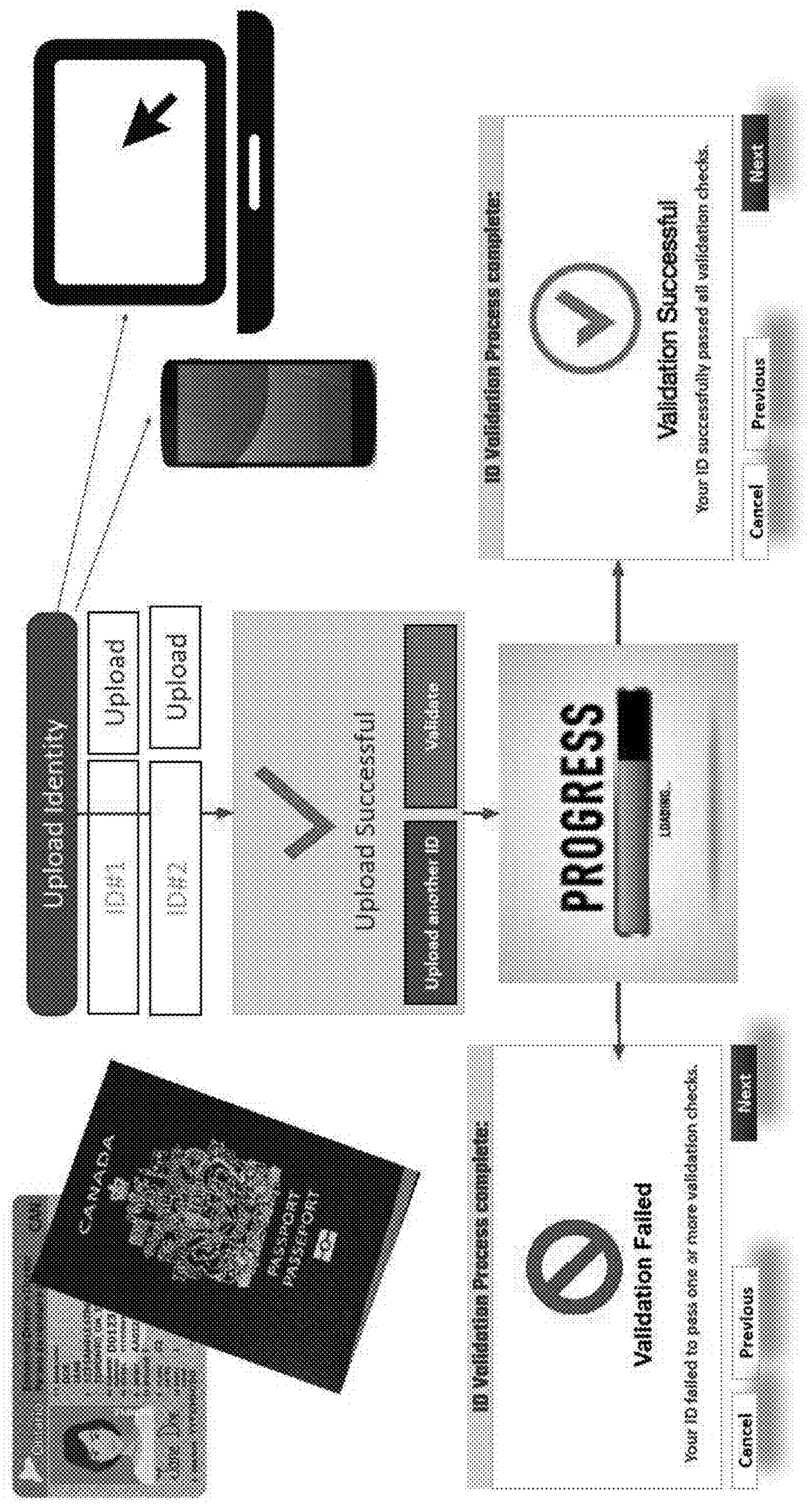
FIG. 2 is a schematic view of a validation process implemented by identity verification platform, according to some embodiments.
Figure 3:
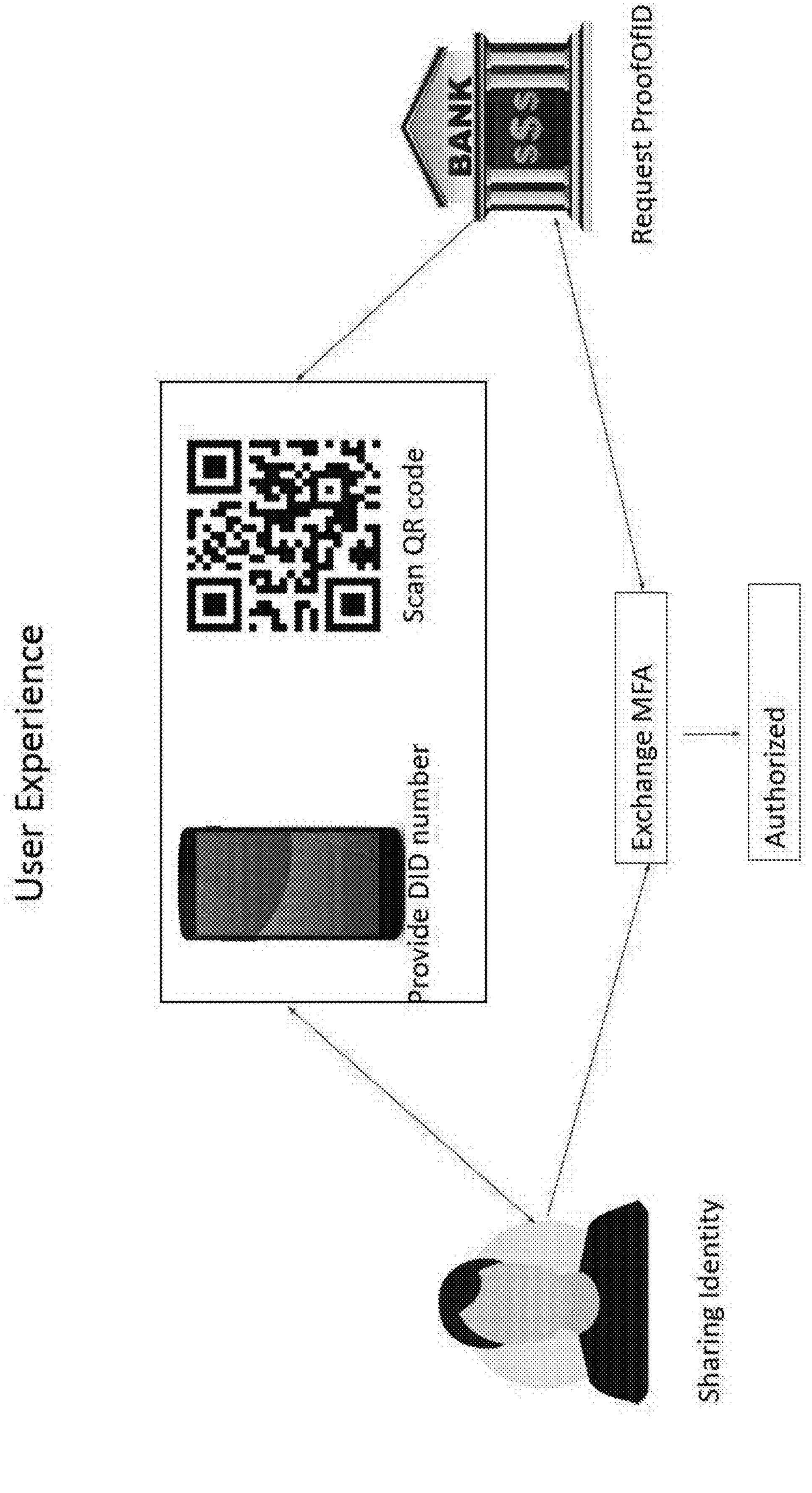
FIG. 3 is a schematic view of an identity sharing process implemented by identity verification platform, according to some embodiments.

In some embodiments, as shown in FIGS. 2 and 3, identity verification platform 100 is configured to operate as follows. First, using a mobile device application for accessing identity verification platform 100, users can upload their identification data, which can include a picture of physical ID, their photograph, legal name, address, and other relevant information, onto an application installed at a local device. Second, the application is configured to connect to the databases of third-parties (e.g., government and/or credit bureau such as third party identity APIs). in order to verify and validate the uploaded identification information. Once the information is verified, a digital ID is generated. The digital ID is generated to link the user's cellphone ID and user name to a key; the key is tokenized and stored in one or more remote databases (e.g., decentralized database(s) managed by identity verification platform 100). No PII data is stored on the network or locally on the identity verification platform 100 network. All PII data remains on the user's local device. A QR code and unique number is generated for the user and provided to the user via the app; the QR code and unique number may be shared with institution users to allow the latter to request and/or obtain the user's identification data from identity verification platform 100. The identification data is fully managed and controlled by users similar to how users have control over their physical ID cards. Third, users may authorize institution users to access their digital proof of ID remotely or in person via multifactor authentication. Institution users will have access to the tokens but not the PII data. For institution users to gain access to a user's ID data, institution users will need to request for access via the identity verification platform 100 app, and upon request, the user will be notified on the app that their ID data is requested. Users will be required to approve access via the app to grant the requestor access to their ID and PII information. The identity verification platform 100 app will also require users to put in place specific security measures on their mobile device, such as, a password. In various embodiments, institution users may not represent an institution but simply a requestor.

Various embodiments have been described in detail. Since changes in and or additions to the foregoing description may be made. Section headings herein are provided as organizational cues. These headings shall not limit or characterize the embodiments.

What is claimed is:

1. A computer-implemented method for identity verification, the method comprising:

validating user identification data associated with a user, wherein the user identification data is stored and retained exclusively on a user device;

generating a token based on the user identification data;

storing the token on a blockchain stored outside of the user device; and receiving a request, at a processor, from a requestor user for the user identification data, alerting the user via multi-factor authentication methods, and, if authorized by the user, returning the token being used to encrypt the user identification data to the requestor user following grant of the request by the user, wherein the method encrypts the user identification data at rest on the user device using client-side encryption, encrypts data in transit using an additional encryption layer separate from HTTPS/TLS, and prevents access to a client application on the user device until a user identity is verified.

2. The computer-implemented method of claim 1, further comprising generating a data representation encoding data for requesting the user identification data, based on the user identification data.

3. The computer-implemented method of claim 2, wherein the data representation encodes a public key associated with the user and usable for decrypting the token.

4. The computer-implemented method of claim 1, the validating user identification data comprises requesting validation from a remote service.

5. The computer-implemented method of claim 1, further comprising updating the system based on update data received from a remote server.

6. The computer-implemented method of claim 1, further comprising generating at least one display configured to request the user identification data and to receive at least one request for the user identification data.

7. The computer-implemented method of claim 1, further comprising generating a user account following validation of the user identification data.

8. The computer-implemented method of claim 1, wherein the token returned to the requester is encrypted using private-public key pairs.

9. The computer-implemented method of claim 1, further comprising decrypting the token using a public key associated with the user.

10. A non-transitory computer readable medium storing a set of machine-interpretable instructions, which, when executed, cause a processor to perform a method for identity verification, the method comprising:

validating user identification data associated with a user, wherein the user identification data is stored and retained exclusively on a user device;

generating a token based on the user identification data;

storing the token on a blockchain stored outside of the user device; and receiving a request, at a processor, from a requestor user for the user identification data, alert the user via multi-factor authentication methods, and, if authorized by the user, return the token being used to encrypt the user identification data to the requestor user following grant of the request by the user, wherein the method encrypts the user identification data at rest on the user device using client-side encryption, encrypts data in transit using an additional encryption layer separate from HTTPS/TLS, and prevents access to a client application on the user device until a user identity is verified.

* * * * *